(12) United States Patent
Kalani

(10) Patent No.: US 8,733,491 B2
(45) Date of Patent: May 27, 2014

(54) METHOD AND APPARATUS FOR AN OFFROAD VEHICLE

(76) Inventor: Paul Hassanali Kalani, Irvine, CA (US)

( * ) Notice: Subject to any disclaimer, the term of this patent is extended or adjusted under 35 U.S.C. 154(b) by 17 days.

(21) Appl. No.: 13/347,692

(22) Filed: Jan. 10, 2012

(65) Prior Publication Data

US 2012/0175180 A1   Jul. 12, 2012

Related U.S. Application Data

(60) Provisional application No. 61/431,391, filed on Jan. 10, 2011.

(51) Int. Cl.
*B62D 61/02*   (2006.01)
*B62K 11/00*   (2013.01)

(52) U.S. Cl.
USPC .......................................... 180/227; 180/219

(58) Field of Classification Search
USPC ........................ 180/219, 227, 228, 230, 231
See application file for complete search history.

(56) References Cited

U.S. PATENT DOCUMENTS

| | | | | |
|---|---|---|---|---|
| 5,388,659 A | * | 2/1995 | Pepe | 180/219 |
| 5,495,913 A | * | 3/1996 | Salisbury | 180/227 |
| 6,338,393 B1 | * | 1/2002 | Martin | 180/227 |
| 6,343,667 B2 | * | 2/2002 | Sauve | 180/228 |
| 6,394,213 B1 | * | 5/2002 | Tsai | 180/181 |
| 6,431,302 B2 | * | 8/2002 | Patmont et al. | 180/228 |
| 6,668,959 B2 | * | 12/2003 | McDermott et al. | 180/220 |
| 6,830,255 B2 | * | 12/2004 | Cheng | 280/87.041 |
| 7,100,729 B2 | * | 9/2006 | Patmont et al. | 180/181 |
| 2004/0016582 A1 | * | 1/2004 | Ho | 180/181 |
| 2004/0031632 A1 | * | 2/2004 | Kohda et al. | 180/68.5 |

* cited by examiner

*Primary Examiner* — Joseph M Rocca
*Assistant Examiner* — Marc A Scharich
(74) *Attorney, Agent, or Firm* — Kafantaris Law Offices; Theo Kafantaris

(57) ABSTRACT

A two-wheeled motorized scooter is disclosed as an off-road vehicle capable of off-road use. The off-road vehicle utilizes a rigid chassis, a motor and transmission offering both low end torque and structural rigidity, and a suspension assembly capable of offering handling and control necessary for typical off-road use.

15 Claims, 5 Drawing Sheets

METHOD AND APPARATUS FOR AN OFFROAD VEHICLE

CROSS-REFERENCE TO RELATED APPLICATIONS

This application claims the benefit of U.S. Provisional Patent Application No. 61/431,391, filed on Jan. 10, 2011, and incorporated herein by reference.

STATEMENT REGARDING FEDERALLY SPONSORED RESEARCH AND DEVELOPMENT

Not Applicable.

FIELD OF THE INVENTION

This invention relates generally to a motorized vehicle means in an off-road environment, and more particularly, to a two wheeled scooter with a unique suspension and transmission for off-road use.

DISCUSSION OF RELATED ART

Motorized vehicles are commonly used to provide a means for travel and recreational use. An off-road vehicle is typically characterized as a vehicle capable of driving on and off paved or gravel roads. Off-road vehicles typically have large tires with deep tread, a flexible suspension, and extra ground clearance. Off road environments comprise unpaved roads, sand, riverbeds, mud, snow, rocks, and other natural or artificial terrain.

Off-road vehicles come in many variations and sizes, and are designed to be durable and rugged. It is common for two or four wheeled vehicles to be used in off-road environments. Typical two wheeled off-road vehicles, or dirt bikes, typically utilize a shorter wheelbase, higher ground clearance, and larger wheels when compared to other street legal two-wheeled vehicles. A rear swingarm is often utilized to allow the rear wheel to pivot vertically while the suspension absorbs any impact received by the rear wheel.

A scooter is a motorized vehicle with two wheels, a step-through frame, and a platform for the operator's feet. Scooters may or may not include a seat, and are typically not suited for long distance riding or highway operation. Scooters are popular due to their low cost and ease of operation. Most scooters are powered by a 2-stroke engine, which requires a mixture of oil and gasoline instead of gasoline itself. Emissions from a 2-stroke engine are typically worse than those from a 4-stroke engine. A scooter may or may not include a rear swingarm.

Typical scooters are not suitable for off-road use due to their simplified chassis, lack of power, low ground clearance, and lack of a proper suspension. Furthermore, a typical scooter is not geared properly to provide adequate low end torque for climbing various hills and other obstacles. Therefore, a need exists for a scooter that contains a more rigid chassis, gearing for low-end torque, and a suspension suitable for off-road use. The present invention accomplishes these objectives.

SUMMARY OF THE INVENTION

The present invention comprises a two-wheeled motorized scooter capable of off road use. This is accomplished by utilizing a rigid chassis, a unique transmission offering both low end torque and structural rigidity, and a unique suspension capable of offering superior handling and control necessary for typical off-road use.

Off-road vehicles are commonly ridden over elevated terrain, resulting in high-impact forces once the vehicle returns to the ground. As such, the chassis of the present invention is made from a material rigid enough to provide support to the vehicle and operator during jumps and other high-impact landings. Suitable materials comprise steel, but may also include any other suitable material or alloy, or light-weight materials such as aluminum and titanium. Furthermore, square-shaped tubing was used to increase stiffness, but any shape can be used.

The chassis includes several separate pieces that must be connected in a way that maximizes the structural stiffness and rigidly of the materials. As such, the chassis is welded using a TIG welding method. While this method is the best mode utilized for the present invention, any suitable welding method can be used so long as it maintains maximum rigidity and stiffness for the chassis as a whole.

The transmission of the present invention comprises a continuously variable transmission (CVT) that can change through an infinite number of effective gear ratios. The CVT allows the present invention the requisite low-end torque necessary for climbing steep hills and other obstacles, while still maintaining a suitable gear ratio for higher speed operation. Furthermore, due to the CVT transmission, the use of the present invention is simplified due to a lack of a clutch or other gear changing mechanism.

The transmission also provides structural support for the chassis and suspension. The transmission is positioned above and within close proximity to the rear swingarm and attaches directly to several critical frame members used to retain the rear swingarm and suspension assembly. The transmission consists of a driver sprocket and a driven sprocket. The driver sprocket is attached to the engine, and the driven sprocket is incorporated within the rear swingarm and chassis. Furthermore, the two piece transmission is uniquely positioned vertically and is driven with a belt to provide smooth and efficient flow of energy to the rear sprocket and rear wheel.

The suspension assembly of the present invention comprises a unique horizontal design comprising a spring, shock absorber, and several unique suspension members. The suspension members create a linkage between the shock/spring and the rear swingarm.

The linkages are specifically designed to provide support for high-impact forces received by the rear wheel during jumps or other off-road use.

The suspension assembly is engineered mainly for off-road use, but it is also capable of providing adequate control for road use as well. It is specifically designed to allow suitable handling to at higher speeds without any necessary adjustments. Furthermore, the suspension is fully adjustable, and may be tailored to the operator's specific riding preference.

The wheel sizes for the present invention are 8 inches in diameter with a width of 7 inches. The tires of the present invention are oversized at 19.5 inches for the front and 18 inches for the rear, and very wide at 9.5 inches. The tires contain deep tread suitable for off-road use. The tire size can vary between 16 inches and 22 inches for various types of terrain.

The handlebars contain controls for braking using standard disc brakes on the rear wheels. The handlebars are also fully adjustable, allowing comfortable use for riders of all heights. Furthermore, while the present invention does provide a seat, it is mainly designed for standing use. Lastly, the present invention utilizes a 4-stroke engine, which increases power and is more environmentally friendly than typical 2-stroke engines.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention comprises a two-wheeled motorized scooter capable of off road use. This is accomplished by utilizing a rigid chassis, a unique transmission offering both low end torque and structural rigidity, and a unique suspension capable of offering superior handling and control necessary for typical off-road use.

Figure 1:
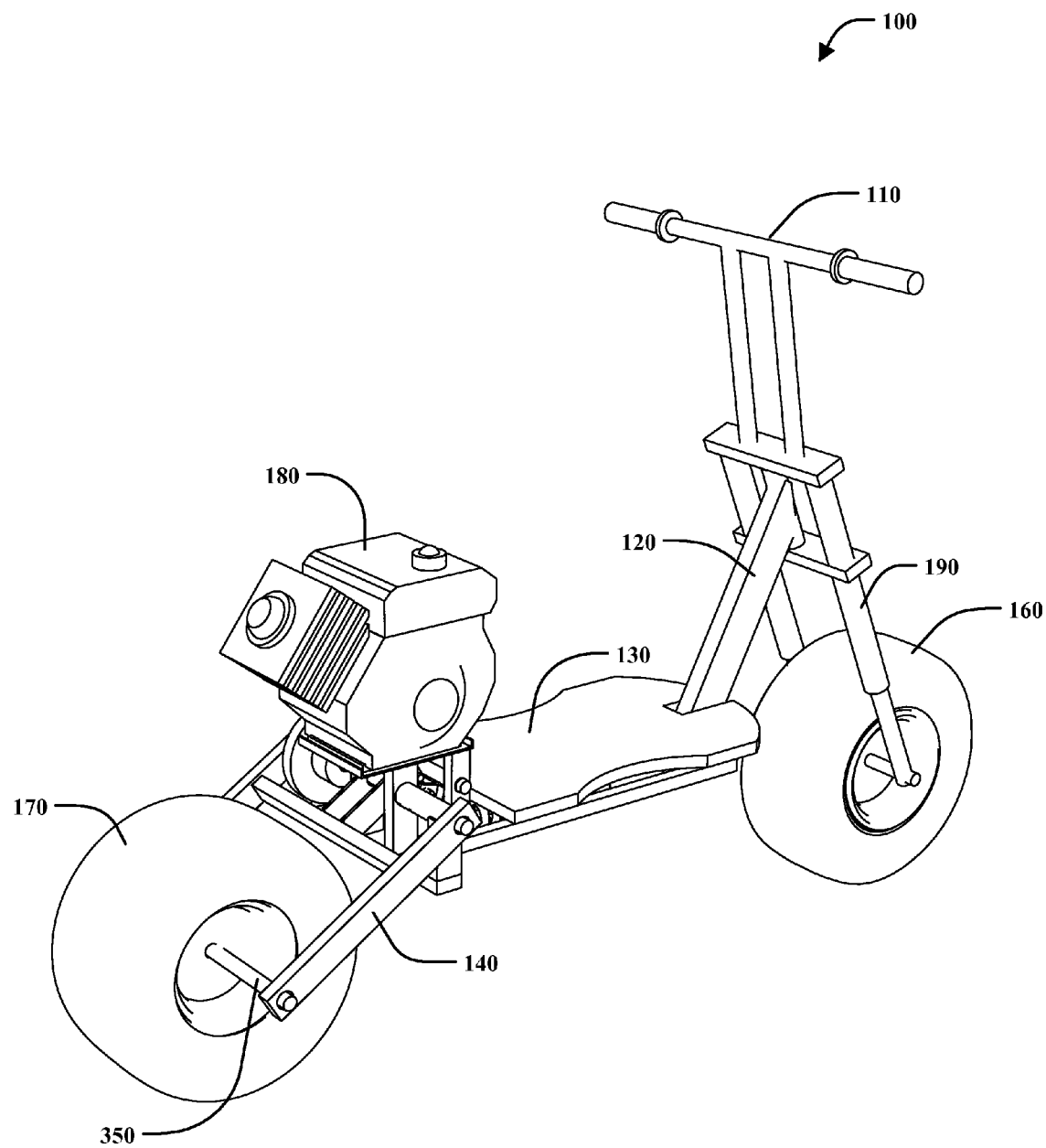
FIG. 1 is a right perspective view of the invention.
Figure 2:
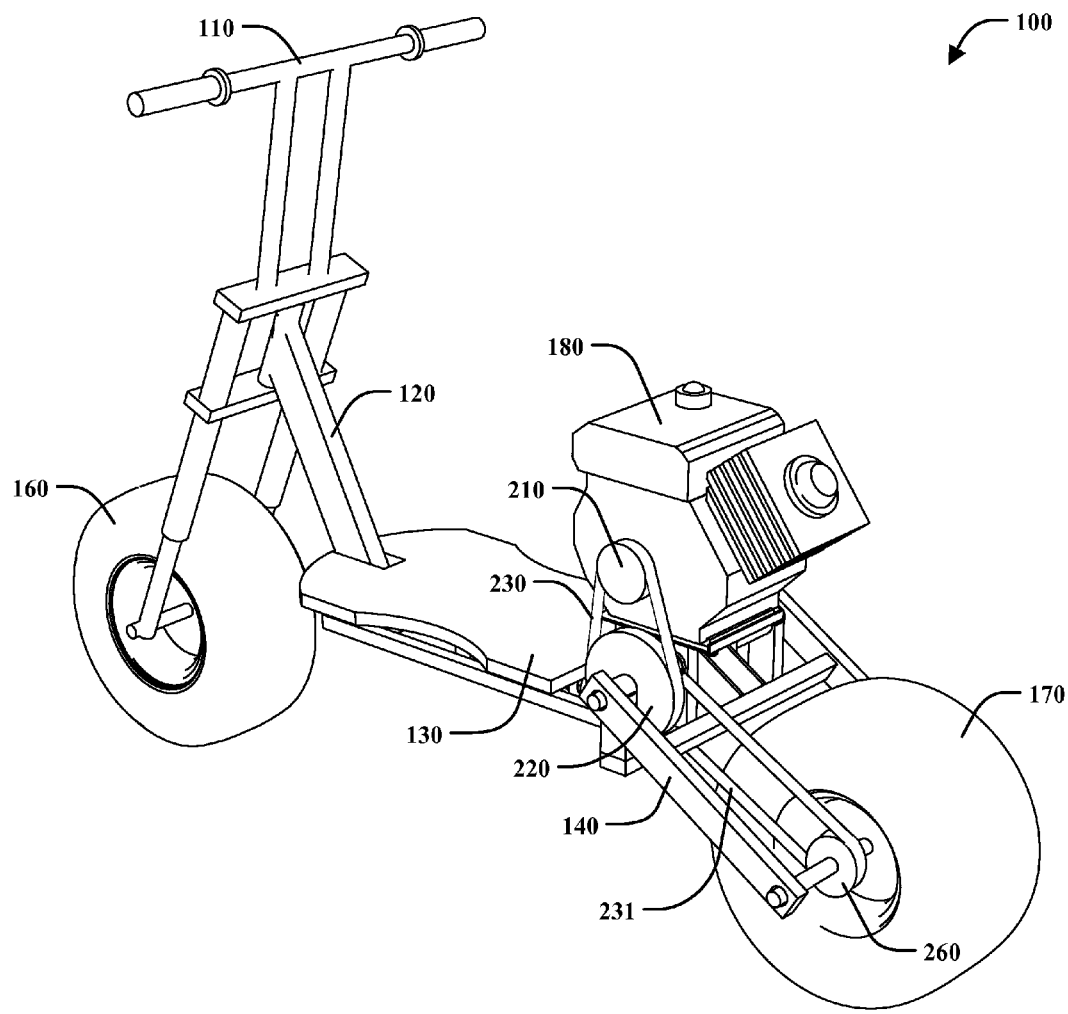
FIG. 2 is a left perspective view of the invention.

FIG. 1 and FIG. 2 are diagrams illustrating the off-road vehicle 100 in which one embodiment of the invention may be practiced. The off-road vehicle 100 comprises handlebars 110 which are connected to the chassis 120. The chassis is covered by a standing platform 130, or footboard, and is connected to the rear swingarm 140 by the suspension assembly 150.

The motor, such as an engine 180 sits above the suspension assembly 150 and aids in creating a rigid structure for the off-road vehicle 100. The front wheel 160 is attached to the front fork 190 and the rear wheel 170 is attached to the swingarm 140. The suspension assembly 150 connects the chassis 120 and the rear swingarm 140.

Figure 3A:
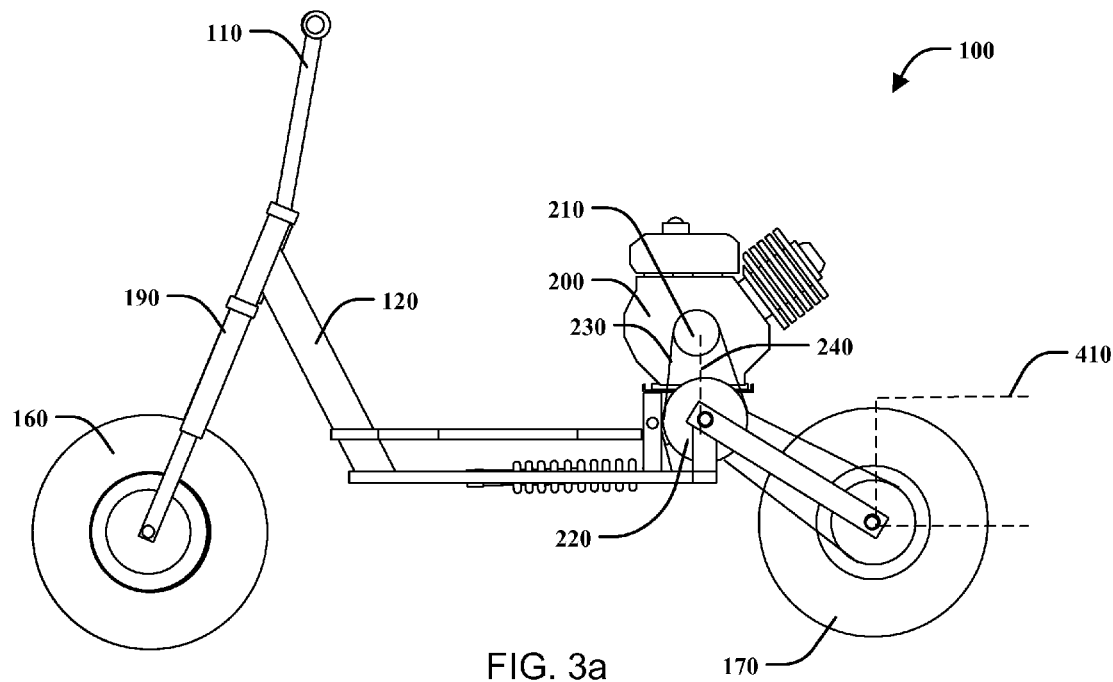
FIG. 3a is a left side view of the invention without compression.
Figure 3B:
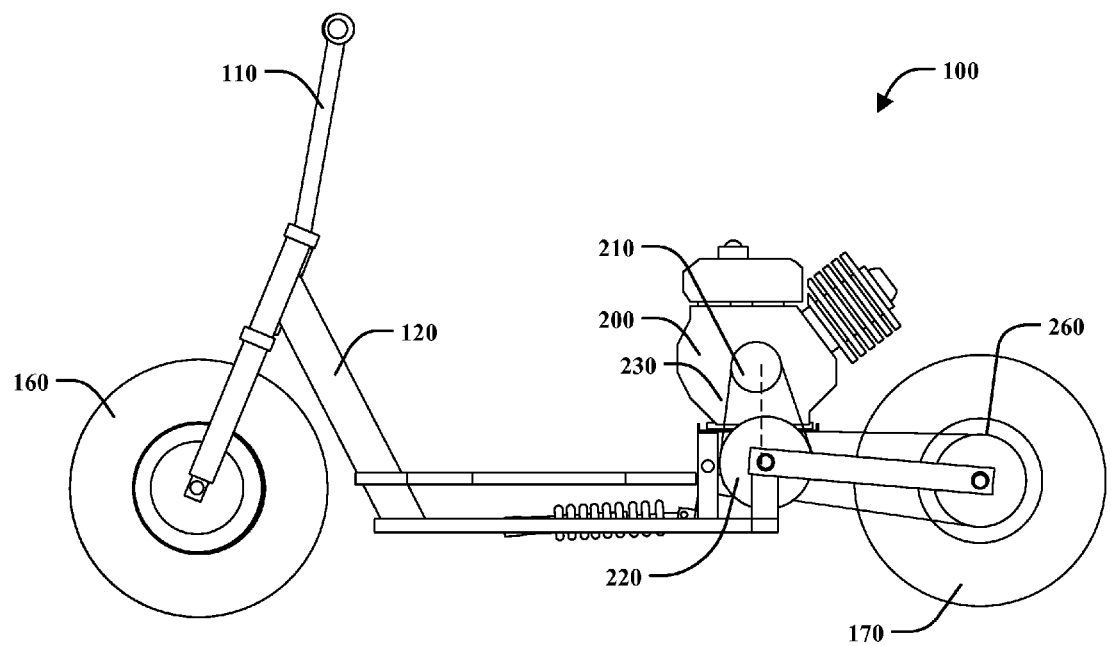
FIG. 3b is a left side view of the invention with compression.
Figure 4:
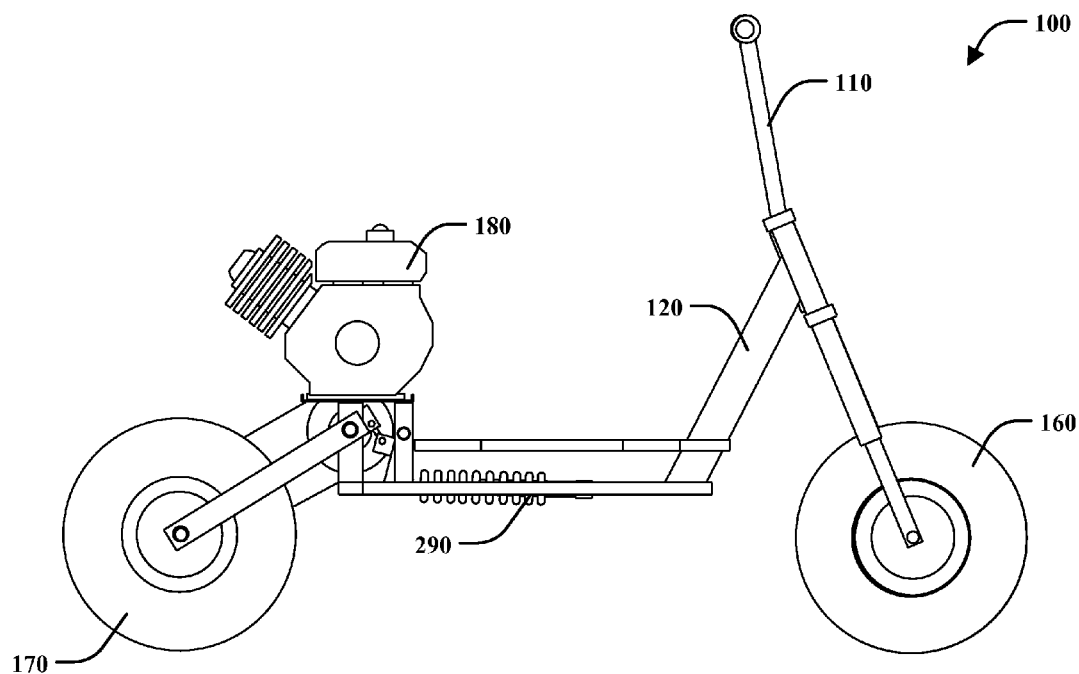
FIG. 4 is a right side view of the invention without compression.

FIG. 3a is a diagram illustrating the off-road vehicle 100 from a left-side view in which the invention is uncompressed, while FIG. 3b illustrates the off-road vehicle 100 from the left side view in which the invention is compressed, and FIG. 4 illustrates the off-road vehicle 100 from a right-side view in which the invention is uncompressed. These views illustrate the role of the transmission 200 in greater detail. The transmission 200 utilizes a driver sprocket 210 to deliver power to the driven sprocket 220 with a belt 230. The driver sprocket 210 and driven sprocket 220 are placed along the same vertical line 240 and in close proximity, reducing obstruction and complexity with the power delivery of the off-road vehicle 100.

Furthermore, the driven sprocket 220 and the front sprocket 250 are placed along the same center of circumference and in close proximity of one another, again reducing obstruction and complexity of the power delivery of the off-road vehicle 100, and creating a fixed distance between the front sprocket 250 and rear sprocket 260. The front sprocket 250 and the rear sprocket 260 are connected with a belt 231 or chain, whose efficiency will benefit from the fixed distance between the sprockets 250, 260.

Figure 5:
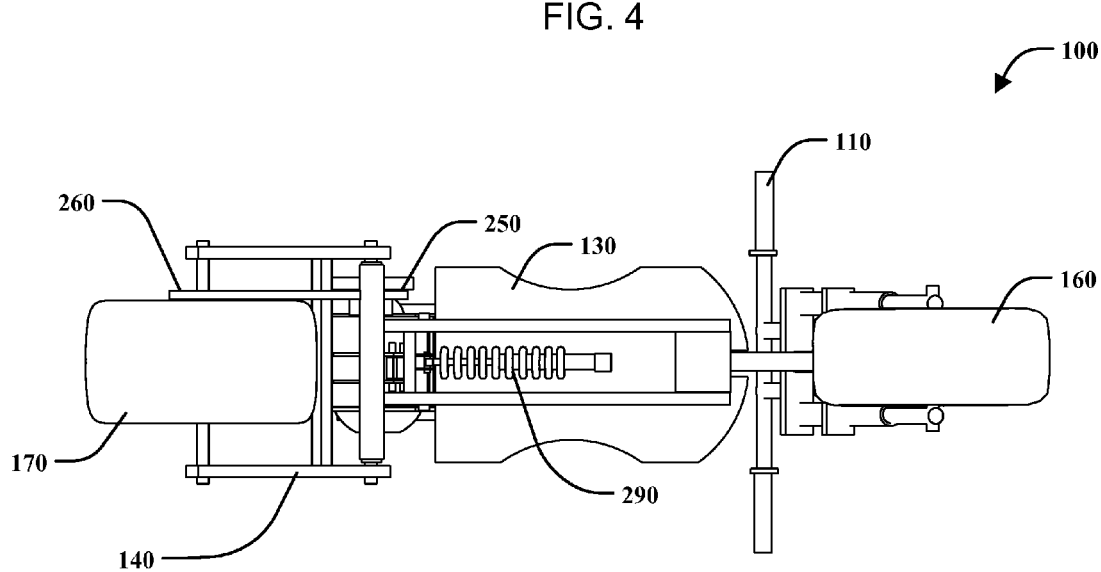
FIG. 5 is a bottom view of the invention.

FIG. 5 is a diagram illustrating the off-road vehicle 100 from a bottom view in which one embodiment of the invention may be practiced. This view illustrates the connection of the suspension assembly 150, shock absorption means 290 and with the chassis 120. The shock 270 and spring 280 connect the chassis 120 and the suspension assembly 150. The suspension assembly 150 and swingarm 140 are retained by a swingarm axle 300. The shock 270 and spring 280 use the suspension assembly 150 to control the motion of the swingarm 140 which pivots on the swingarm axle 300.

Figure 6:
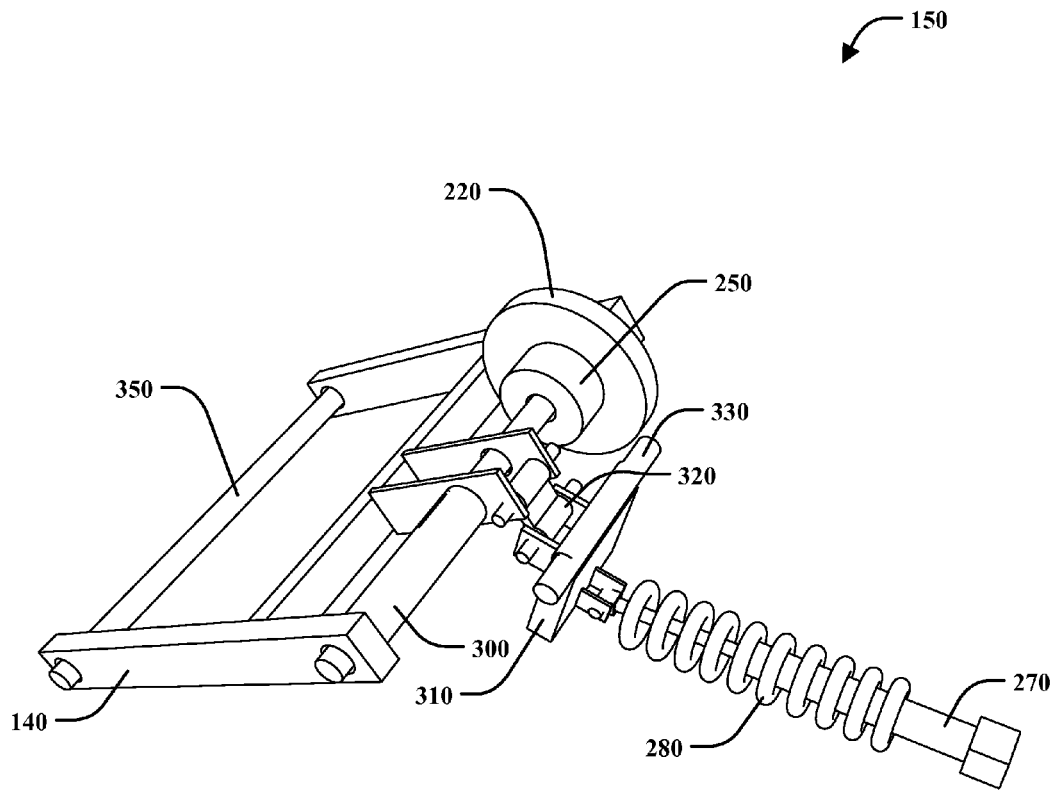
FIG. 6 is a perspective view of the suspension assembly.

FIG. 6 is a diagram illustrating the suspension assembly 150 in greater detail in which one embodiment of the invention may be practiced. The suspension assembly 150 comprises a pivot member 310 and a linkage member 320. The pivot member 310 is pivotally attached to the shock absorption means 290, and pivots horizontally along a pivot axle 330. The pivot member 310 is connected to the swingarm 140 using a linkage member 320. The swingarm 140 can travel between 8-12 inches 410 (shown in FIG. 3a), depending on the shock absorption means 290, which can have between 2-4 inches of travel.

The linkage member 320 is an integral part of the suspension assembly 150. The linkage member 320 receives the horizontal force of the shock absorption means 290, and transfers it to the swingarm 140. The horizontal force is converted to vertical force due to the pivoting along the pivot axle 330 and the swingarm axle 300. The swingarm 140 then applies the vertical force to the rear wheel 170 via the rear axle 350 (also shown in FIG. 1). The linkage member 320 also provides enough play between the swingarm 140 and pivot member 310 to prevent lockup and allows for a smoother transfer of force between the two members. In an alternative embodiment, the linkage member 320 can be omitted, and the swingarm 140 can attach directly to the pivot member 310.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms.

Accordingly, the inventor reserves the right to add additional claims after filing the application to pursue such additional claim forms for other aspects of the invention.

What is claimed is:

1. An off-road vehicle comprising:
   a rigid chassis defining a step-through space;
   a standing platform arranged at a bottom of said step-through space;
   a front fork having a rotatable front wheel and a steering handle positioned for use by a standing rider;
   a rear swingarm having a rotatable rear wheel, said rear swingarm pivotally attached to said chassis about a swingarm axle;
   a suspension assembly positioned between said rear swingarm and said chassis, said suspension assembly further comprising a pivot member, a linkage member, and a shock absorption means;
   a powertrain having a motor and a continuously variable transmission, said powertrain fixedly mounted to said chassis above said suspension assembly and operationally connected to said rear wheel;
   said shock absorption means further comprising a shock and spring positioned below and parallel to said standing platform, said shock absorption means having a first and second end, said first end fixedly attached to said chassis, said second end pivotally attached to said pivot member, said pivot member pivotally attached to said linkage member and pivotally attached to said chassis, and said linkage member pivotally attached to said rear swingarm;
   wherein said powertrain and rear wheel maintain a constant distance from each other, and wherein said shock absorption means utilizes said pivot member and said linkage member to control a motion of said rear swingarm about said swingarm axle to be within an angle range of 0 to 45 degrees.

2. The off-road vehicle of claim 1, wherein said transmission further comprises:
   a driver sprocket coupled to said motor;
   a driven sprocket coupled to said swingarm axle;
   wherein said driver and driven sprockets are aligned along a common vertical axis.

3. The off-road vehicle of claim 2 further comprising:
   a front sprocket coupled to said swingarm axle;
   a rear sprocket coupled to said rear wheel;
   wherein said front sprocket and said driven sprocket share a common center of circumference and wherein said driven sprocket and said rear sprocket are spaced apart from each other at a fixed distance.

4. The off-road vehicle of claim 3, wherein said powertrain delivers power to said driver sprocket, which delivers power to said driven sprocket, which delivers power to said front sprocket, which delivers power to said rear sprocket, which delivers power to said wheel, wherein said sprockets are positioned in close proximity to reduce obstruction and complexity of the power delivery of the off-road vehicle.

5. The off-road vehicle of claim 1, wherein said pivot member further comprises a pivot axle for rotatable attachment to said chassis.

6. The off-road vehicle of claim 5, wherein said pivot member and linkage member translate a horizontal force of said shock absorption means into a vertical force by pivoting along the pivot axle and the swingarm axle, said vertical force applied to said rear wheel through said rear swingarm.

7. The off-road vehicle of claim 6, wherein said linkage member provides an amount of distance between said rear swingarm and said pivot member which prevents lockup of the suspension assembly.

8. The off-road vehicle of claim 5, wherein said pivot member is attached directly to said rear swingarm.

9. The off-road vehicle of claim 1, wherein said front and rear wheels are between 17 and 23 inches in diameter.

10. The off-road vehicle of claim 1, wherein said steering handle is spaced between 12 and 16 inches from said front fork.

11. The off-road vehicle of claim 1, wherein said shock absorption means has an adjustable length.

12. The off-road vehicle of claim 1, wherein said linkage member has an adjustable length.

13. An off-road vehicle comprising:
   a rigid chassis defining a step-through space;
   a standing platform arranged at a bottom of said step-through space;
   a front fork having a rotatable front wheel and a steering handle positioned for use by a standing rider;
   a rear swingarm having a rotatable rear wheel, said rear swingarm pivotally attached to said chassis about a swingarm axle;
   a suspension assembly positioned between said rear swingarm and said chassis, said suspension assembly further comprising a pivot member, a linkage member, and a shock absorption means;
   a powertrain having a motor and a continuously variable transmission, said powertrain fixedly mounted to said chassis above said suspension assembly and operationally connected to said rear wheel;

said shock absorption means having a shock and spring positioned below and parallel to said standing platform, said shock absorption means having a first and second end;

said first end fixedly attached to said chassis;

said second end pivotally attached to said pivot member;

said pivot member pivotally attached to said linkage member and pivotally attached to said chassis;

said linkage member pivotally attached to said rear swingarm;

a driver sprocket coupled to said motor;

a driven sprocket coupled to said swingarm axle;

a front sprocket coupled to said swingarm axle;

a rear sprocket coupled to said rear wheel;

wherein said shock absorption means utilizes said pivot member and said linkage member to control a motion of said rear swingarm about said swingarm axle to be within an angle range of 0 to 45 degrees.

14. The off-road vehicle of claim 13, wherein said powertrain delivers power to said driver sprocket, which delivers power to said driven sprocket, which delivers power to said front sprocket, which delivers power to said rear sprocket, which delivers power to said rear wheel.

15. The off-road vehicle of claim 14, wherein said pivot member and linkage member translate a horizontal force of said shock absorption means into a vertical force by pivoting along a pivot axle and the swingarm axle, said vertical force applied to said rear wheel through said rear swingarm.

* * * * *